United States Patent [19]

Bruni et al.

[11] Patent Number: 4,721,698

[45] Date of Patent: Jan. 26, 1988

[54] HIGH POROSITY SILICOCALCAREOUS MASS

[75] Inventors: Maurice Bruni, Tremblay-les-Gonesse; Georges Delode, Champigny-sur-Mrne; Rolland Perraudin, Bagnolet, all of France

[73] Assignee: L'Air Liquide—Societe Anonyme pour l'Etude et l'Exploitation des Procedes Georges Claude, Paris, France

[21] Appl. No.: 848,852

[22] Filed: Apr. 4, 1986

Related U.S. Application Data

[63] Continuation of Ser. No. 629,252, Jul. 6, 1984, abandoned, and a continuation-in-part of Ser. No. 377,185, May 11, 1982, Pat. No. 4,467,041, which is a continuation-in-part of Ser. No. 330,450, Dec. 14, 1981, Pat. No. 4,467,040.

[30] Foreign Application Priority Data

May 13, 1981 [FR] France ................................. 81 09538

[51] Int. Cl.⁴ .............................................. B01J 20/10
[52] U.S. Cl. ..................................... 502/407; 502/411; 502/526; 206/0.6; 501/80; 106/120
[58] Field of Search ............................ 501/80; 106/120; 252/62, 457; 206/0.6, 0.7; 502/407, 411, 526

[56] References Cited

U.S. PATENT DOCUMENTS

| | | | |
|---|---|---|---|
| 3,406,030 | 10/1968 | Perraudin et al. | 106/86 |
| 3,501,323 | 3/1970 | Moorehead | 106/120 |
| 3,895,096 | 7/1975 | Helser et al. | 501/80 |
| 3,988,419 | 10/1976 | Mori | 106/120 |
| 4,115,140 | 9/1978 | Hums et al. | 106/120 |
| 4,118,450 | 10/1978 | Nakamura et al. | 501/80 |
| 4,128,434 | 12/1978 | Pusch | 106/120 |
| 4,131,638 | 12/1978 | Whitaker et al. | 106/120 |
| 4,193,958 | 3/1980 | Uchida et al. | 106/120 |
| 4,238,240 | 12/1980 | Krijgsman | 106/120 |
| 4,349,463 | 9/1982 | Flanigen | 206/0.7 |

Primary Examiner—Mark L. Bell
Attorney, Agent, or Firm—Browdy and Neimark

[57] ABSTRACT

A high porosity silicocalcareous mass is obtained by using in at least partial replacement of the usual silica, amorphous ultrafine synthetic silica particles having a specific surface between 150 and 300 m² per gram, and a high absorption capacity, and optionally adding nonreactive synthetic fiber of either inorganic or organic origin to the mixture containing the particles. The high-porosity silicocalcareous mass can be used as a lining material for containers, which are intended for storing liquified or dissolved gases and also as an insulation material, such as sound insulation in building construction.

16 Claims, No Drawings

HIGH POROSITY SILICOCALCAREOUS MASS

This application is a continuation of application Ser. No. 629,252, filed July 6, 1984, now abandoned, which is a continuation-in-part of both application Ser. No. 330,450 filed Dec. 14, 1981, now U.S. Pat. No. 4,467,041 and Ser. No. 377,185 filed May 11, 1982, now U.S. Pat. No. 4,467,040 the contents of which are incorporated by reference.

FIELD OF THE INVENTION

This invention relates to a high-porosity silicocalcareous mass usable particularly in the field of lining materials for containers intended to store dissolved gases and also usable in the field of insulating materials.

BACKGROUND OF THE INVENTION

In current industrial practice, known porous silicocalcareous masses are made from a thorough mixture of lime, ground silica or ground fossil silica and asbestos in a suspension in water. The resulting paste, introduced in the containers, molds or bottles, is then subjected to heat in an autoclave to initiate and complete the lime-silica reaction which results in producing the silicocalcareous material; this material is then transferred to a drying oven to remove the water and create the desired porosity.

Asbestos is added to the aqueous composition of silica and lime for effecting its function as a reinforcing fiber and suspension agent. However, recent constraints relating to health and safety connected with the handling of asbestos have led to reconsideration of the use of this natural fiber the characteristic properties of which, in making porous silicocalcareous masses, function to reinforce the crystalline structure and to aid in maintaining the suspension of the solid products, namely silica and lime, in a large amount of water.

It is known that the stabilization of the suspension can be markedly improved by the use of suspension agents. The effect of adding substantial amounts, up to 10%, of organic suspension agents is known from U.S. Pat. No. 3,406,030. Certain cellulose derivatives such as alkylhydroxyalkylcelluloses, in particular methyl - and ethyl-hydroxyethylcellulose, make it possible to obtain an excellent stabilization of the suspension. The amount to be introduced varies with the desired degree of stabilization and the nature of the suspension agent.

Compensation for discontinuing use of asbestos by the addition of organic suspension agents in very large amounts has been considered. It has been shown that the addition of an organic suspension agent, in a large amount, can appreciably correct the defect of decanting the solid products during making of the silica/lime and water paste. However, because of the destruction of this type of organic compound during firing of the paste, a decrease in the mechanical properties of the dried high-porosity silicocalcareous masses has been noted. The brittleness, fragility and friability of the resulting porous materials are such that they render them unsuitable for the applications mentioned above.

SUMMARY OF THE INVENTION

It has therefore been sought to develop a thixotropy phenomenon shortly after the filling of the bottle or mold, which would make it possible to line a bottle or mold with a liquid mixture wherein the setting of the paste is then achieved before putting the bottle or mold containers in the autoclave.

It has been found that the addition of amorphous ultrafine synthetic silica, having a high specific surface of 150 to 500 m$^2$ per gram and thus a high absorption capacity, as a total or partial replacement of the ground silica, makes it possible very advantageously to obtain high-porosity homogeneous silicocalcareous masses that exhibit satisfactory mechanical properties. The amorphous ultrafine synthetic silica may be conveniently separated into two groups, a first group having a specific surface area of 200–500 m$^2$ per gram and a second group of 150–300 m$^2$ per gram.

DETAILED DESCRIPTION OF PREFERRED EMBODIMENTS

The aqueous paste, based on mixtures of divided silica and lime, contains at least 50% of ultrafine synthetic silica, and this amorphous ultrafine silica is very advantageously used in an amount between 70% and 100% in relation to the total amount of the silica in the silicocalcareous mass.

The total amount of silica used is slightly greater than that of the lime, in a proportion of 10 to 30% excess, and the water is used in an amount at least three times greater than that of the solids, preferably in a water:solids ratior of 3:1 to 4.6:1.

The particles of amorphous ultrafine synthetic silica have a granulometry on the order of several microns. These elementary particles can be associated in three-dimensional chains thus forming an aggregate type structure, and by drying the aggregates become associated into agglomerates. These particle arrangements in aggregates and agglomerates create a macroporous structure which exhibits a high absorption capacity. This absorption capacity can be expressed by the take-up of liquid in milliliters per 100 g of product, e.g. DOP or oil take-up. The DOP take-up is equal to the amount of dioctylphthalate (DOP) in milliliters necessary to start making 100 g of the product into a paste. The products having an absorption capacity equal to at least 150 ml and preferably between 170 and 350 ml, are particularly suited for use in this process.

These amorphous ultrafine synthetic silicas, sometimes known as silica pigments, are in the form of light fine powders having an apparent specific mass on the order of 0.25 to 0.35 kg/dm$^3$ and capable of absorbing amounts up to twice their weight and sometimes more of water. These ultrafine silicas are made, for example, by the pyrogenation of silicon tetrachloride or by chemical precipitation of a soluble silicate in an aqueous medium.

The amorphous ultrafine synthetic silicas containing a slight molar proportion of water in their molecular constitution, which can be a molar fraction of up to about 1/10, i.e. 10%, and silicas hydrated with a slight amount of water as part of their constitution and containing a slight molar fraction of aluminum oxide and sodium oxide, are very advantageous constituents in making the above-mentioned pasts which are useful for making a silicocalcarous porous mass, such as described above. There are two absorbing amorphous synthetic silicas corresponding to the formulas of 10 $SiO_2$, 1 $H_2O$ and 14 $SiO_2$, 1 $Al_2O_3$, 1 $Na_2O$, 3 $H_2O$, which are particularly suited to making silicocalcareous porous masses, the second of these comprising up to about 10% aluminum oxide and up to about 8% sodium oxide.

These amorphous synthetic silicas can be used either alone or in mixture.

At times there is interest in controlling the thioxotropy phenomenon in order to work with pastes that are easy to handle and do not prematurely set during lining of the containers. The setting of the paste can be slowed down by the use of amorphous ultrafine synthetic silicas having a somewhat slighter absorption capacity. The use of amorphous ultrafine silicas having an absorbing power between 150 ml. and 200 ml. makes it possible to obtain pastes that are easy to handle and to transfer while being maintained in the liquid state for several hours. Ultrafine silicas containing slight molar fractions of aluminum oxide and sodium oxide, each fraction for example being on the order to 1/20, i.e. about 5%, make it possible to achieve excellent results in this regard.

Comparison tests made with amorphous ultrafine silica corresponding to the formula 10 $SiO_2$, 1 $H_2O$ and of ultrafine amorphous synthetic silica corresponding to the formula 14 $SiO_2$, 1 $Al_2O_3$, 1 $Na_2O$, 3 $H_2O$ have made evident the advantage of these mix-tures. A reference viscosity was taken as a standard and was followed by noting the viscosity, which developed, of three pastes made as follows:

paste a: 100% amorphous ultrafine silica, 10 $SiO_2$, 1 $H_2O$, take-up DOP 340, paste b: 50% silica 10 $SiO_2$, 1 $H_2O$, DOP 340 and 50% silica 14 $SiO_2$, 1 $Al_2O_3$, 1 $Na_2O$, 3 $H_2O$, DOP 180, and paste c: 100% 14 $SiO_2$, 1 $Al_2O_3$, 1 $Na_2O$, 3 $H_2O$, DOP 180.

In regard to paste a, the reference viscosity was reached after 60 minutes; with regard to paste b, this same viscosity appeared after 3 hours; and in the case of paste c, this viscosity was reached only after 6 hours of setting of the paste at ambient temperature. These tests clearly showed the role of the absorbing power of the silica.

When a particularly effective high-porosity silicocalcareous material is desired which has a high mechanical strength and is not friable when broken, it has been found advantageous to add a minor proportion of non-reactive synthetic fibers, either of inorganic or organic origin and desirably hydrophilic, having a good mechanical strength. The presence of these synthetic fibers in the silicocalcareous mass improves the toughness of the porous material, thus making the product less fragile to shocks and impacts. These synthetic fibers are introduced into the porous material in a proportion of 3 to 15%, preferably 4 to 6%, in relation to the amount of solids in the materials. Inorganic synthetic fibers, such as alumina silicate fibers, can be used leading to interesting results in this process.

Synthetic chemcial fibers of the layered polymer type such as carbon or carbonaceous fibers, or of the scale polymer type such as aromatic polyamide fibers, alone or in mixture, are advantageous reinforcement fibers for use in the process of this invention. The very strong and very fine carbonaceous fibers may be obtained by pyrolysis of acrylic fibers at the 600° C. stage whereas at 1200° C. carbon fibers are obtained and at 2000° C. graphite fibers.

The paste is prepared by the addition of different constituents in water, namely lime, ground silica (if any), amorphous synthetic ultrafine silica and synthetic fiber (if any). The mixture is stirred for 5 to 20 minutes until a thoroughly homogeneous mixture is obtained, then the resulting paste is introduced into bottles, containers or molds, under a partial vacuum. The bottles are then provided with a porous plug and put into an autoclave for firing for 17 to 24 hours under saturated steam pressure of about 10 bars, and are then subjected to a gradual drying for several days, e.g. about four days, at a maximum temperature of 330° C.

In a first stage of use, the quicklime can be slacked by a thorough mixing of the latter with a portion of water.

The present process makes it possible to obtain silicocalcareous masses wherein the porosity can exceed 90%.

These porous materials are particularly suitable for packing lining containers and bottles which are intended to store dissolved gases, particularly acetylene. The nature of these materials makes them particularly useful in the field of thermal insulation and also in building construction, particularly for use as sound insulation.

Examples that illustrate the invention in a nonlimiting way are set forth below:

EXAMPLE 1

Fabrication of the Porous Mass Without Fibers

There are thoroughly mixed, in a mixer, 48.7 kg of quicklime in 200 liters of water, while stirring for 10 to 15 minutes, to effect complete slaking of the lime; then there are added, in sequential order, 186 liters of water, 15 kg of ground silica (100) and 41 kg of amorphous ultrafine synthetic silica, corresponding to the formula 10 $SiO_2$, 1 $H_2O$, the elementary particles of which are arranged in aggregates and agglomerates which create a macroporous structure having a DOP takeup of 340 (340 ml of DOP per 100 g solid). Stirring is maintained for 10 to 15 minutes until a homogeneous liquid paste is obtained which is quickly introduced, under a partial vacuum of about 600 millibars, into bottles for use in storing acetylene in the dissolved state.

The filled bottles are then provided with a porous plug before being put into the autoclave. The autoclave firing period is 20 hours under a saturated steam pressure of 10 bars, then progressive drying is performed for 4 days at a maximum temperature of 330° C.

After drying, the porous masses, which are contained in the bottles, are homogenous and exhibit a longitudinal shrinking of less than 1 mm, a crushing strength of 15 to 20 kg/cm$^2$ and a porosity of 90%±1%.

EXAMPLE 2

Fabrication of the Porous Mass With Inorganic Fibers

Simultaneously, a mixture made of 423 liters of water, 50 kg of quicklime, 57.5 kg of ultrafine synthetic silica, as in Example 1, and 7 kg of synthetic alumina silicate fibers are added, while stirring is maintained for 20 minutes, before the mixture is transferred into bottles. After firing and drying the mass under the same conditions as described above, the bottles each contain a homogenous mass having 89%±1% porosity and 10 to 20 kg/cm$^2$ mechanical strength.

EXAMPLE 3

Fabrication of the Porous Mass With Carbonaceous Fibers

There are mixed, in a first stage, 250 liters of water and 50 kg of quicklime, for 15 minutes, to effect slaking of the lime (final temperature 56° C.±10° C.). After this, the mixture is transferred into a mixer, and there are added, in sequential order, 148 liters of water, 8 kg of ground silica (100 M) and 49.5 kg of amorphous ultrafine silica of formula 10 $SiO_2$, 1 $H_2O$, having an absorbing macroporous structure, and having a DOP absorption capacity (in ml per 100 g) of 280 after 5 minutes of mixing, whereby a homogenous paste is obtained into which 5.5 kg of carbonaceous fibers are introduced. After firing and drying of the mixture, under the conditions indicated above in Example 1, the porous material exhibits the following physical characteristics: porosity 90%±1% and crushing strength of 20 to 35 kg/cm$^2$.

EXAMPLE 4

Fabrication of the Porous Mass With Carbonaceous Fibers

Slaking of 50 kg of quicklime in 300 liters of water is effected, while vigorous stirring is maintained for 10 minutes; then 205 liters of water and 59 kg of amorphous ultrafine synthetic silica are introduced, while stirring as in Example 3, and the stirring is maintained for 20 minutes. There are then added 4 kg of thoroughly shredded carbonaceous fibers to the mixture and the stirring is continued for 10 minutes after introduction of the fibers. The suspension which is introduced into the containers is subjected to a firing under 11 bars of saturated steam, for 20 hours and then is progressively dried at atmospheric pressure at a maximumn temperature of 330° C. until it achieves constant weight. The silicoalcareous material, thus prepared, has the following physical characteristics: a porosity of 92%±1%, density of 0.210±0.05, and crushing strenght of 15 to 20 kg/cm$^2$.

EXAMPLE 5

Fabrication of the Porous Mass With Carbonaceous Fibers

In a first stage, 250 liters of water and 50 kg of quicklime are mixed for 15 minutes to effect complete slaking of the lime. Then, the mixture is transferred into a mixer, and there are added, in sequential order, 148 liters of water, 28 kg of amorphous ultrafine synthetic silica of formula 10 $SiO_2$, 1 $H_2O$, having an absorbing macroporous structure and a DOP absorption capacity (in ml per 100 g) of 280, and 29.5 kg of amorphous ultrafine synthetic silica, corresponding to the formula 14 $SiO_2$, 1 $Al_2O_3$, 1 $Na_2O$, 3 $H_2O$, having an absorbing macroporous structure and a DOP absorption capacity (in ml per 100 g) of 180. A homogenous paste is obtained, after 5 minutes of mixing, into which 5.5 kg of carbonaceous fibers are introduced.

After firing and drying, under the conditions indicated above, the porous material exhibits the following physical characteristics: porosity 90%±1% and crushing strength of 20 to 35 kg/cm$^2$.

EXAMPLE 6

Fabrication of the Porous Mass With Carbonaceous Fibers

Slaking of 50 kg of quicklime in 300 liters of water is effected, while vigorous stirring is maintained for 10 minutes, then there are introduced, while stirring, 205 liters of water and 50 kg of amorphous ultrafine synthetic silica corresponding to the formula 14 $SiO_2$, 1 $Al_2O_3$, 1 $Na_2O$, 3 $H_2O$ and having a specific suface of 180 m$^2$/g, and an absorbing macroporous structure with a DOP absorption capacity (in ml per 100 g) of 180; stirring is maintained for 20 minutes.

There are then added 4 kg of thoroughly shredded carbonaceous fibers, and stirring is continued for 10 minutes after introduction of the fibers into the mixture. The suspension, which is introduced into containers, is subjected to firing under 11 bars of saturated steam, for 20 hours, and then progressively dired at atmospheric pressure at a maximum temperature of 330° C. until it achieves a constant weight.

The silicocalcareous material, thus prepared, has the following physical characteristics: a porosity of 92% ±1, density of 0.210±0.05, and a crushing strength of 15 to 20 kg/cm$^2$.

It will be obvious to those skilled in the art that various changes may be made without departing from the scope of the invention and the invention is not to be considered limited to what is described in the specification.

What is claimed is:

1. A gas storage bottle for storing gases therein, said gas storage bottle being filled with a dried and fired homogeneous silicocalcareous mass having a high porosity of about 89–92% and a resistance to crushing of between 10 and 35 kg/cm$^2$ and constituting the fired product of an aqueous paste consisting essentially of lime, water, 3–15% based on solids of synthetic fibers, and silica made up at least in part of ultrafine synthetic silica, said aqueous paste containing at least 50%, based on total silica, of ultrafine synthetic silica with a large specific surface of 150–500 m$^2$ per gram, the total amount of silica being slightly greater than the amount of lime in a proportion of 10–30% excess and the water being present in amount of at least three times greater than that of the solids, said synthetic fibers being selected from the group consisting of alumina silicate fibers, carbonaceous fibers and aromatic polyamide fibers.

2. A gas storage bottle according to claim 1, wherein the ultrafine synthetic silica has a large specific surface of 200–500 m$^2$ per gram and the silica is present in an excess over the lime of 10–20%.

3. A gas storage bottle according to claim 2, wherein the aqueous paste contains 70–100%, based on the total silica, of said ultrafine synthetic silica.

4. A gas storage bottle according to claim 2, wherein said synthetic fibers are synthetic alumina silicate fibers or carbonaceous fibers.

5. A gas storage bottle according to claim 2, wherein the paste components are added to the water in the following order: quick lime, silica and synthetic fibers with stirring for 5 to 20 minutes until there is obtained a liquid paste, said liquid paste is rapidly introduced into a container under partial vacuum, said filled container is fitted with a porous plug and is held in a autoclave for firing, said firing lasting on the order of 17-24 hours under a saturated steam pressure of about 10 bars, and the so-fired container is then subjected to a gradual drying for several days at a maximum temperature of 330° C.

6. A gas storage bottle according to claim 2, wherein said water in said paste is present in an amount of 3.5-4.6 times the weight of solids.

7. A gas storage bottle according to claim 2, wherein said synthetic fibers are present in an amount of 4-6% based on the solids.

8. A gas storage bottle according to claim 1, wherein said ultrafine synthetic silica has a specific surface between 150 and 300 m² per gram.

9. A gas storage bottle according to claim 8, wherein the silica consists of 70-100% by weight, based on the total silica present, of said amorphous ultrafine synthetic silica having a specific surface between 150 and 300 m² per gram.

10. A gas storage bottle according to claim 8, wherein the ratio of water to solids in said paste is 3 to 4.6.

11. A gas storage bottle according to claim 8, wherein the absorption compacity of the particles of amorphous ultrafine synthetic silica, corresponding to the amount of dioctylphthalate in mililiters necessary to start making 100 grams of the product into a paste, is at least equal to 150 ml.

12. A gas storage bottle according to claim 8, wherein the amorphous ultrafine synthetic silica in said paste consists of agglomerates of a macroporous structure selected from the group consisting of silica containing a slight proportion of water of constitution, silica containing a slight molar fraction of aluminum oxide and a slight molar friction of sodium oxide, and mixtures thereof.

13. A gas storage bottle according to claim 8, wherein the amount of fibers present is between 4 and 6% by weight based on the amount of solids in the mass.

14. A gas storage bottle according to claim 11, wherein said amorphous ultrafine synthetic silica has an absorption capacity, corresponding to the amount of dioctylphthalate in milliliters necessary to start making 100 grams of the product into a paste, between 170 and 350 milliliters.

15. A method of forming a liner for a container in order to provide means within said container for storing dissolved gases therein, comprising:

introducing into the container an aqueous paste consisting essentially of lime, water 3 up to about 15% based on solids of synthetic fibers, and silica made up at least in part by ultrafine synthetic silica, said aqueous paste containing at least 50%, based on total silica, of ultrafine synthetic silica with a large specific surface of 150-500 m² per gram, the total amount of silica being slightly greater than the amount of lime in a proportion of 10-30% excess and the water being present in an amount of at least three times greater than that of the solids, said synthetic fibers being selected from the group consisting of alumina silicate fibers, carbonaceous fibers and aromatic polyamide fibers, and firing and progressively drying said aqueous paste to provide a silicocalcareous lining having a high porosity of about 89-92% and a resistance of crushing of between 10 and 35 kg/cm².

16. A method of storing gas within a gas storage bottle, comprising feeding gas into said bottle, said bottle containing a porous liner for retaining gas therewithin, the improvement wherein said liner comprises a dried and fired silicocalcareous mass having high porosity of about 89-92% and a resistance to crushing between 10 and 35 kg/cm² formed from an aqueous paste consisting essentially of lime, water, 3-15% based on solids of synthetic fibers, and silica made up at least in part of ultrafine synthetic silica, said aqueous paste containing at least 50%, based on total silica, of ultrafine synthetic silica with a large specific surface of 150-500 m² per gram, the total amount of silica being slightly greater than the amount of lime in a proportion of 10-30% excess and the water being present in amount of at least three times greater than that of the solids, said synthetic fibers being selected from the group consisting of alumina silicate fibers, carbonaceous fibers and aromatic polyamide fibers.

* * * * *